Oct. 28, 1969  E. V. HARDWAY, JR  3,475,763
DRIVE MECHANISM
Original Filed Jan. 19, 1966  3 Sheets-Sheet 1
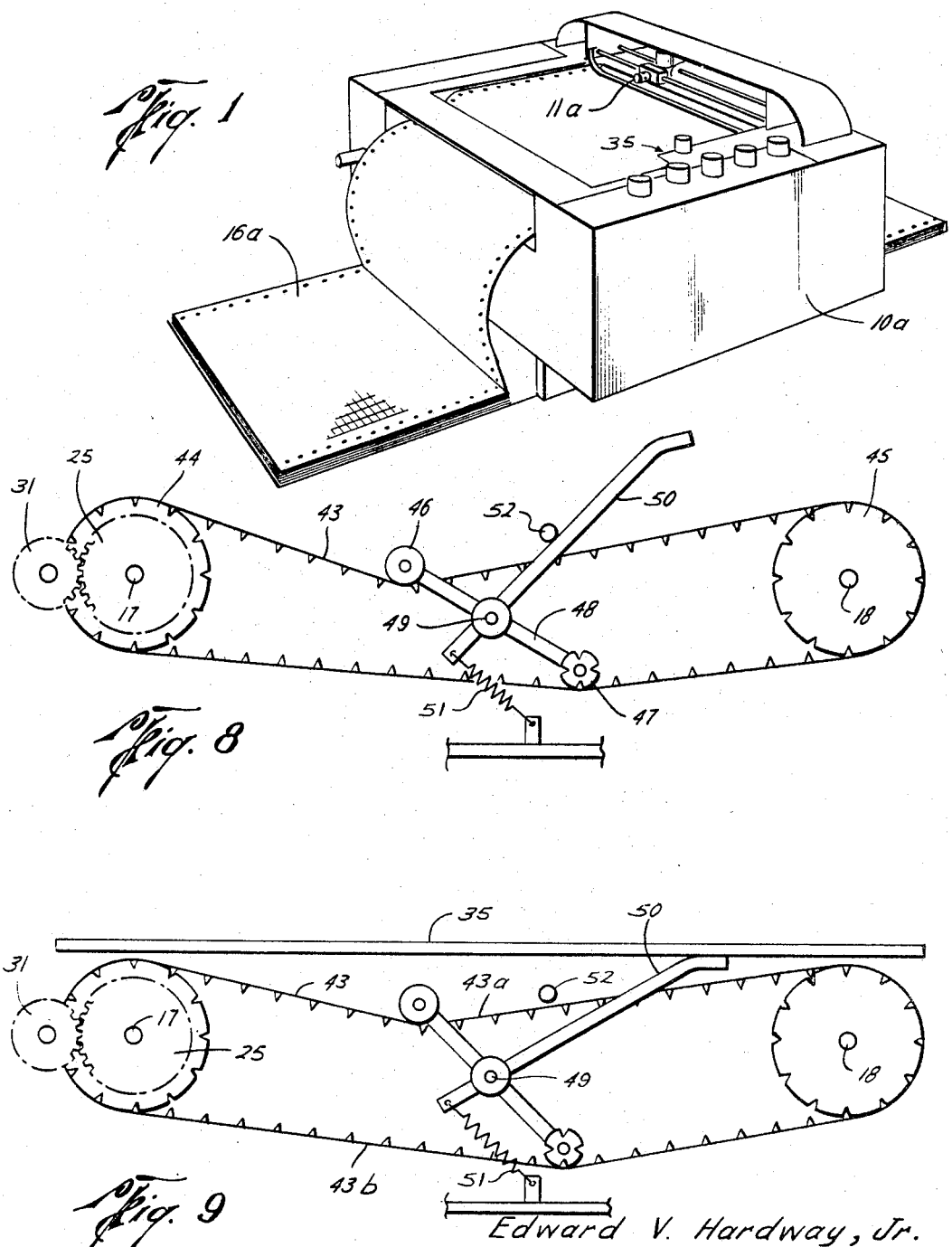
Edward V. Hardway, Jr.
INVENTOR.
BY
ATTORNEYS Oct. 28, 1969  E. V. HARDWAY, JR  3,475,763
DRIVE MECHANISM
Original Filed Jan. 19, 1966  3 Sheets-Sheet 2
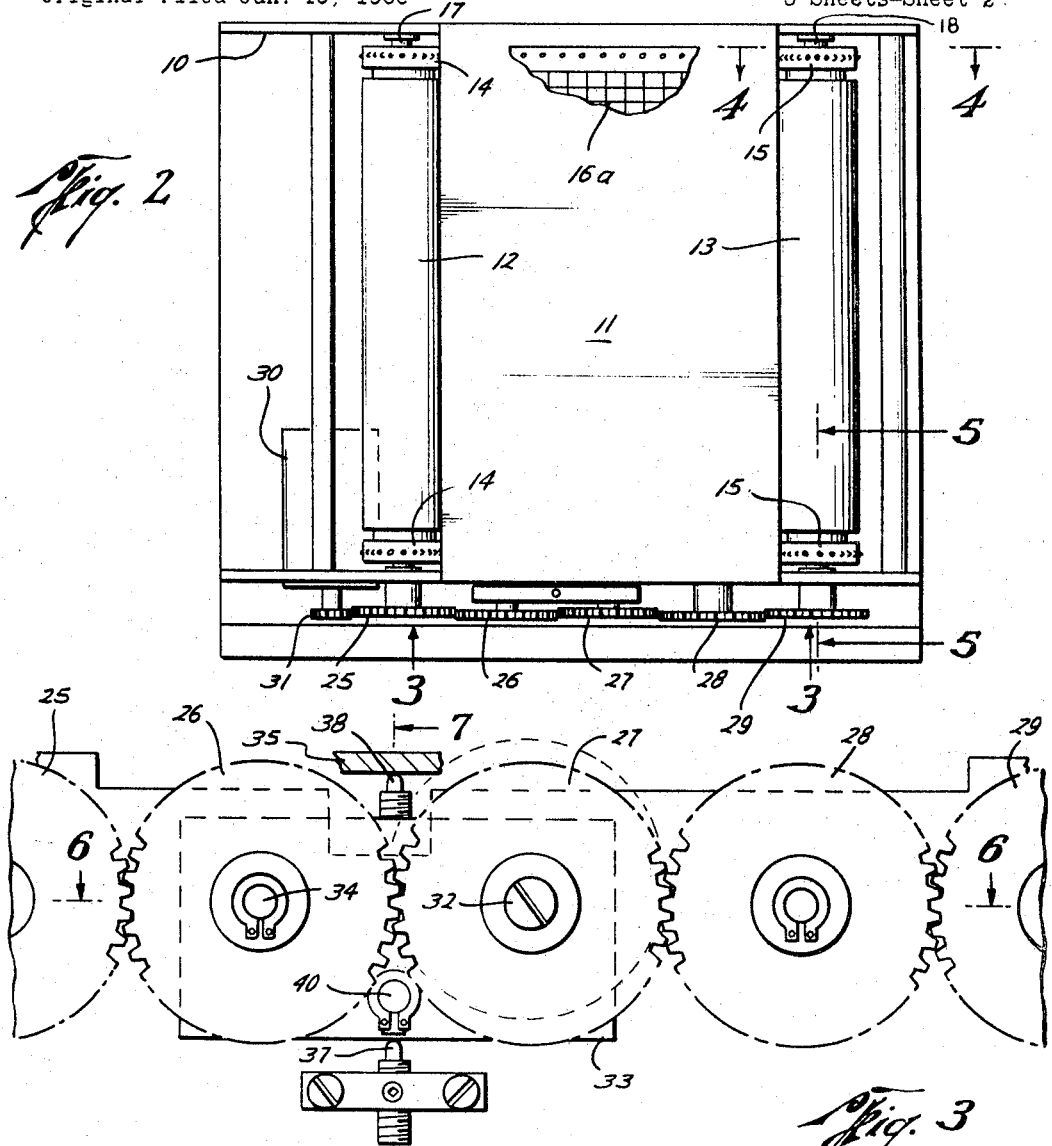
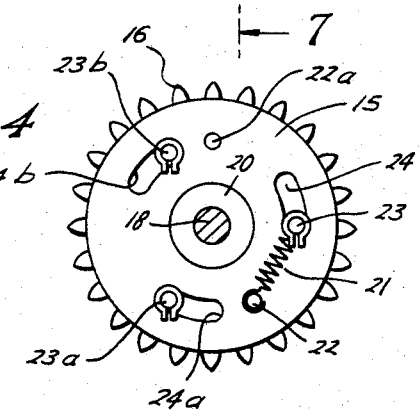
Edward V. Hardway, Jr.
INVENTOR.
BY Browning, Simmons, Hyer
& Eichenroht
ATTORNEYS Oct. 28, 1969 E. V. HARDWAY, JR 3,475,763
DRIVE MECHANISM Original Filed Jan. 19, 1966 3 Sheets-Sheet 3

Edward V. Hardway, Jr.
INVENTOR

BY Browning, Simms, Hyer
& Eichenroht
ATTORNEYS

United States Patent Office 3,475,763
Patented Oct. 28, 1969

3,475,763
DRIVE MECHANISM
Edward V. Hardway, Jr., Houston, Tex., assignor, by mesne assignments, to Bausch & Lomb Incorporated, Rochester, N.Y., a corporation of New York
Continuation of application Ser. No. 521,666, Jan. 19, 1966. This application Dec. 2, 1968, Ser. No. 781,703
Int. Cl. G01d 15/24
U.S. Cl. 346—136         13 Claims

ABSTRACT OF THE DISCLOSURE

A drive mechanism for a graphic recorder provides a reversible non-slipping driving connection between spaced sprockets. The chart paper is tensioned by the driving connection in either forward or reverse direction.

---

This is a continuation of Ser. No. 521,666, filed Jan. 19, 1966, and now abandoned.

This invention relates to a drive mechanism, such as for a strip chart recorder, for moving a strip of recording or playback medium with perforated sprocket holes along its length wherein the mechanism is designed to tension a portion of the strip in an area of interest where information is being recorded or played back and to accurately position this area of interest with respect to the mechanism's drive sprocket or sprockets along, and in a plane perpendicular to, the direction of movement of the strip, even when the strip is being started, stopped, moved at high speeds, subjected to high accelerations, or is caused to expand or contract as a result of changes in temperatures or humidity.

When a portion of perforated flexible strip is positioned by two sprockets or sets of sprockets, spaced some distance apart along the length of the strip, all sprockets must turn in unison or the strip will either buckle or tear. In unidirectional drive mechanisms for strip chart recorders, it is common to have one sprocket or set of sprockets drive the strip and the other sprocket or set of sprockets to maintain tension. The tensioning sprocket or sprockets are usually driven at a higher speed through a slip clutch. In some unidirectional recording apparatus such as in a number of simple strip chart recorders, a single driven roller with a sprocket at one or both ends of the roller, and some form of drag device such as a slip clutch on the chart roll holder, is used and is sufficient to tension the chart paper and cause it to lie flat under the recorder pen. But such mechanisms are unsuitable bidirectional drives when the strip must be reversed while maintaining exact synchronism of the perforated strip, the drive sprocket or sprockets, and the driving means. For example, in a point plotting recorder, designed for reading out information sequentially from a multichannel analyzer, it is essential for channel identification to have each of the points plotted for each successive channel to fall in a predetermined position with respect to the grid lines printed on the recorder chart. It is also desirable to be able to reverse direction and plot information stored in each channel over a longer time period with exact coincidence of the plot for each channel number along the chart length. Precise synchronism of the drive and the chart is also essential when X–Y plots are made on a section of the chart with the chart being moved in proportion to an input variable X.

In the prior art, complex bi-directional drive mechanisms have been employed involving gear shifting mechanisms, clutches or the like to move the driving power from one set of sprockets to another set in order to reverse direction, with a torque motor or slip clutch acting on the non-driving sprockets to maintain tension. Such reversible drive mechanisms are not only costly and complex, but are unsuited to high dynamic performance and high accuracy applications such as in high speed X–Y recorders where the chart strip must move in response to an input variable X signal as the recording pen moves in response to an input variable Y signal. One prior art bi-directional recorder drive mechanism employs two rollers spaced apart along the length of the chart with sprockets fixed to the end of each roller and with a direct gear drive between the two rollers so that the latter rotate in unison. Such a device has two major disadvantages making it impractical for general usage. First, extreme precision is necessary in the gearing between the two rollers for a proper mesh of corresponding sprockets with the chart paper perforations greatly adding to the cost. Second, and more important, chart paper and most recording media expand and contract with temperature and humidity changes sufficiently to cause buckling or excess tension in the section between the two sets of sprockets in such a device. A satisfactory recorder drive mechanism must allow for expansion and contraction of the recording paper or other recording media used while maintaining tension of the chart in the area of the pen, particularly when pre-folded Z or fan folded paper is used. In many cases, the drive mechanism must also be capable of sudden reversals of chart movement without losing accuracy in positioning the chart with respect to the drive sprockets, and without relieving tension or tearing the chart because of excess tension. It is, therefore, desirable to minimize inertial effects which add to or decrease the tension during acceleration or deceleration. Slip or drag clutches or contra-acting torque motors, common to the chart drive mechanism art, create tension by opposing the action of the driving motor and, therefore, reduce the dynamic accuracy and overall performance of the recording device in which they are used.

As indicated above, it is important to maintain the strip chart under tension, regardless of direction of movement. Various means have been suggested by the prior art, but these do not maintain synchronism when reversals occur, or they involve energy consuming and complex arrangements of clutch and gear mechanisms with severe dynamic performance limitations, or they require a precision coupling means between two sprockets and sprocket sets, and have no provision for controlling tension or preventing buckling when the strip chart expands or contracts from changes in temperature or humidity.

It is, therefore, an object of this invention to provide a simple, low cost bi-directional drive mechanism for use with a strip of recording medium in which the medium's position and movement are controlled by a single sprocket or set of sprockets regardless of the direction of movement of the medium, and in which a section of the medium is maintained under controlled tension, even though the material of the recording medium may expand or contract because of changes in temperature or humidity.

Another object is to provide such a mechanism which can be reversed or used bi-directionally while maintaining exact synchronism under all conditions, including reversals, between the position of the strip of recording medium in the section of interest, and the driving means causing rotation of the drive sprocket or sprockets of the mechanism, whether such means be a servo motor, stepper motor or other source of power.

Another object is to provide such a mechanism which not only accomplishes the foregoing objects but which also minimizes inertial forces transmitted to the recording medium by the sprocket teeth during periods of high accelerations and decelerations of the medium so as to avoid excess tension which would tear the recording medium as well as release of tension in the area of interest which would, in turn, permit buckling.

Another object is to provide such a mechanism in which the means for applying tension to the recording medium in the area of interest does not consume a material amount of energy from the power source or servo-mechanism driving the recording medium and thereby detract from the dynamic performance of the recording device in which it is utilized.

Another object is to provide such a mechanism to position and tension a section of a strip of recording medium wherein, in a preferred form, the recording medium can be quickly loaded onto sprockets positioned to mesh with the sprocket holes in the medium and wherein the tension may then be applied by a manual actuator or an actuator operated by closing the door or cover of the device in which the mechanism is incorporated.

Other objects, advantages and features of the invention will be apparent from a consideration of the specification, claims and appended drawings, wherein:

FIG. 1 is a pictorial view of a strip chart recorder having the drive mechanism of this invention therein and showing how Z-fold chart paper can be used;

FIG. 2 is a plan view of a chart drive mechanism embodying the invention;

Figure 5:
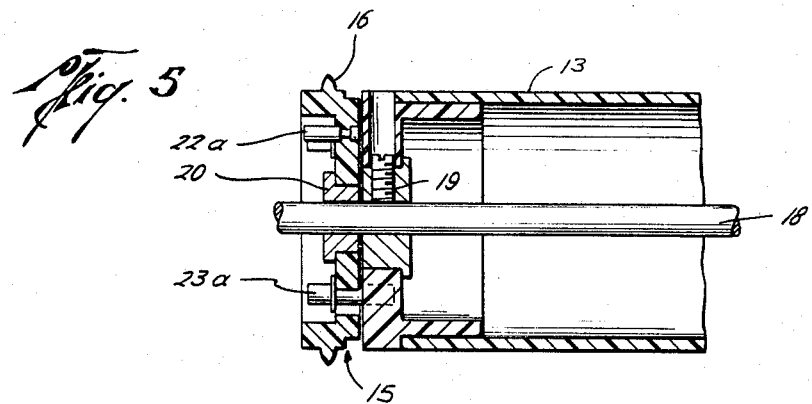
Figure 6:
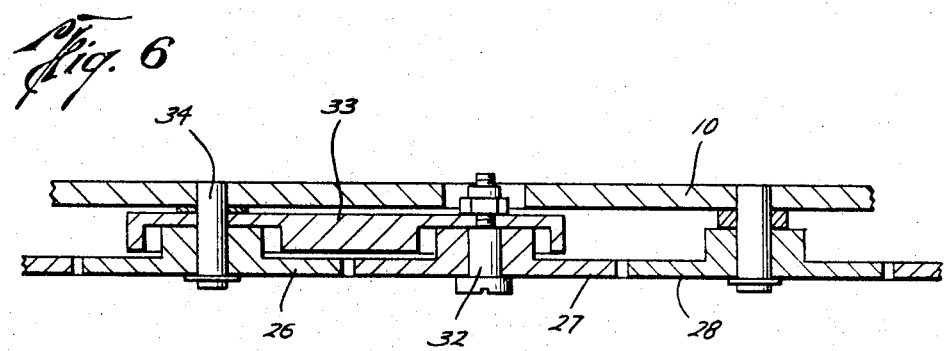
Figure 7:
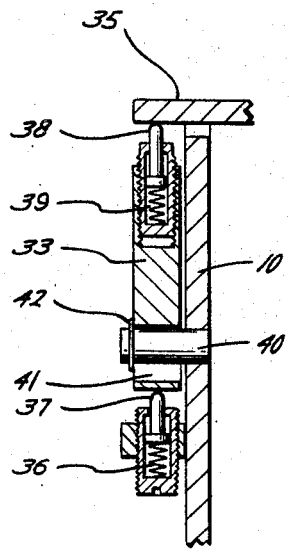

FIGS. 3, 4 and 5 are views taken on the lines 3—3, 4—4 and 5—5, respectively, of FIG. 2;

FIGS. 6 and 7 are views taken on the lines 6—6 and 7—7, respectively, of FIG. 3; and FIGS. 8 and 9 show an alternative for the gearing arrangement of FIGS. 2, 3, 6 and 7.

Like character of reference will be used throughout the several views to designate like parts.

Referring to FIGS. 1 and 2, the drive mechanism includes a frame 10 which is adapted to be positioned inside of a recorder case 10a along with associated components, which can be conventional, to make up a strip chart recorder. The housing is provided with a platen 11 in the writing area of the pen 11a to provide a solid backup for a strip chart 16a which is shown in FIG. 1 as the Z-fold type. Disposed at either end of the platen are chart rollers 12 and 13 and associated pairs of sprockets 14 and 15. While ordinarily it is preferred to use pairs of the sprockets at either end, in some cases a single sprocket at each end will be sufficient especially for narrow charts. In any event, the sprockets are provided with projections or teeth 16 disposed to engage the perforations in the strip chart 16a. Chart roller 12 and sprockets 14 are fixed to a shaft 17 which can be rotatably mounted on the frame. If desired, the sprockets 14 can be integral with roller 12.

Chart roller 13 and sprockets 15 are likewise mounted upon a shaft 18 which in turn is rotatably mounted on the frame. However, in this case, only roller 13 is fixed to shaft 18, as by a set screw 19 (FIG. 5), while sprockets 15 are rotatably mounted on the shaft 18 as by a bushing 20.

Also included in the drive mechanism are means providing a reversible positive non-slipping driving connection between sprockets 14 and 15 to cause them to rotate in unison and for tensioning a strip of record medium when the sprockets cause it to lie smooth in the area where a record is being made or played back and also to accurately position the record medium with respect to one set of sprockets, e.g. sprockets 14, regardless of whether the record medium is being moved in a forward or reverse direction.

The foregoing means can be in a form such that sprockets 15 are resiliently biased to cause them to tend to rotate with respect to sprockets 14 in a direction to tension a record medium engaged by the sprockets 14 and 15 regardless of the direction of chart movement. This can take the form of a resilient torque transmitting connection between shaft 18 and sprockets 15 although other tensioning means can be used as discussed below. As shown in FIGS. 4 and 5, a preferred type of connection includes a spring 21 extending between a pin 22 fixed to sprocket 15 and a pin 23 fixed to the chart roll and extending through a slot 24 in the sprocket. Additional pins 23a and 23b can also extend through slots 24a and 24b so that snap rings can be attached to the end of each pin, thus preventing the sprocket from moving longitudinally on the shaft and keeping it in close parallel relationship with the chart roller. An additional pin 22a can be provided so that the same sprocket can be used for either end of the roller 13, it being understood that the lower sprocket 15, as shown in FIG. 2, will be assembled with the spring 21 attached to pin 22a.

With this arrangement, it can be seen that if roller 13 is held from turning and chart paper is placed to engage sprockets 15 and then pulled to the left in FIG. 2 to rotate the sprockets 15 and thereby tension springs 21 after which the chart paper is placed in engagement with sprockets 14, the chart will be under the tension developed by the springs 21. Then if the rollers are rotated in unison, the tension in the chart paper will be continuously maintained regardless of the direction of movement of the chart and regardless of expansion and contraction of the chart along its length.

While springs 21 are preferred to form the resilient torque transmitting connection between sprockets 15 and shaft 18, other devices performing substantially the same function could be used. For example, a pair of magnets, one connected to the shaft and the other to the sprocket could be used. Also, a D.C. torque motor with slip rings, with the rotor attached to the shaft and the stator to the sprockets, would be a less preferred embodiment. Other forms of such type of connection will be apparent to one skilled in the art once he has become knowledgeable of this disclosure.

The means forming the reversible positive non-slipping driving connection between sprockets 14 and 15 can take several forms but a preferred form is shown as including a set of intermeshing gears 25 through 29 with gears 25 and 29 being fixed respectively to shafts 17 and 18. With this arrangement, it can be seen that the drive mechanism is positive and non-slipping, and it will cause the two sprockets to rotate in unison.

A suitable driving motor 30, such as a stepper or servo motor, is provided to rotate the sprockets as through a driving gear 31 which meshes with gear 25. The motor 30 should be reversible so that the chart can be driven in either direction.

With this arrangement, and with the chart in place as above described and springs 21 under tension, the chart will always be precisely positioned with respect to sprockets 14, and hence with respect to driving motor 30, regardless of the direction of the chart's movement. Thus when the chart is moving to the right in FIG. 1, it is in effect fed by sprockets 14 while sprockets 15 and their resilient torque transmitting connection with sprockets 14 pull the chart paper to the right while maintaining it in tension. When the chart is moving to the left, it is positively pulled by the sprockets 14 while again the sprockets 15 maintain it in tension. The chart is always precisely positioned despite any stretching or shrinkage thereof and despite any variation in tolerances of the spacing of the chart perforations or in the tolerances in the chart drive mechanism itself. Moreover, since sprockets 15 are mounted on a shaft 18 independently of chart roller 13, inertial effects can be minimized. Thus by making the sprockets of relatively light weight and the tension of springs 21 just enough to maintain the chart in proper tension, the chart can be subjected to high accelerations and decelerations and rapid reversals without imposing excessive stresses on the chart and the latter is effectively isolated from inertial effects caused by roller 13, shaft 18 and the interconnecting gearing 25 through 29.

As indicated above, the strip chart can be initially tensioned by placing it over sprockets 15 and then pulling it back to sprockets 14 to tension the springs. In a preferred form, an automatic means for tensioning the chart is provided so that the chart can be simply placed loosely onto sprockets 14 and 15 and the automatic means will tension it. Thus, means are provided for rotating sprockets 15 to tension the chart by rotating shaft 18 to tension springs 21. In the illustrated form, gear 27 is rotatably mounted upon a shaft 32 which in turn is carried by an arm 33. The arm in turn is pivotally mounted on a shaft 34 on which sprocket 26 is also rotatably mounted. It will thus be seen that by moving gear 27 laterally of adjacent gears 26 and 28 while maintaining them in tooth engagement, at least the gear 28 will be rotated to cause it to in turn to rotate gear 29 and shaft 18. Thus, when the gear 27 is moved from the dashed line to the solid lined position of FIG. 3, and with motor 30 preventing gear 25 from turning, gear 29 will be turned in a clockwise direction to thereby turn shaft 18 to rotate sprockets 15 relative to sprockets 14 thereby tensioning the chart and, upon further rotation of the shaft, tensioning springs 21 to provide a resilient force transmitting connection between sprockets 15 and shaft 18. If desired, this action can be made to take place automatically in response to closing of the recorder cover or door 35 by providing a spring 36 urging a plunger 37 (FIG. 7) upwardly against the arm 33 so that when door 35 is lifted, the arm 33 will be moved upwardly to the dashed line position of FIG. 3. The arm is also provided with another plunger 38 and spring 39 which are engaged by the door as it closes to move arm 33 downwardly thereby tensioning the chart. By making spring 39 stronger than spring 36, one can be assured that the arm 33 will always be moved downwardly to properly tension the chart.

A pin 40 can extend through a slot 41 in arm 33 to act as a stop to limit upward travel of the arm. Also, a snap ring 42 can be placed on the pin to help maintain arm 33 in alignment so that gears 26, 27 and 28 always remain meshed.

In a less preferred form, sprockets 15 can be attached fixedly to shaft 18 and spring 39 employed to cause tensioning of the strip chart. Thus the strength and length of spring 39 can be selected so that when the door is closed to move arm 33 down to a predetermined position, the sprockets 15 will be rotated to tension the strip chart and by adjusting the strength of spring 39, the amount of tensioning can be controlled. This type of arrangement is less preferred than the one above described because it does not minimize inertial effects and because selection of a spring 39 to give the proper chart tensioning and yet allow for a stretch of the chart, etc. is relatively difficult.

While it is preferred that the reversible positive non-slipping driving connection between the sprockets be in the form of the gear train described above, other arrangements meeting these qualifications can be used. For example, as shown in FIGS. 8 and 9, a flexible nonstretch drive belt 43, commonly called a timing belt, can connect cog wheels 44 and 45 which are respectively fixed to shafts 17 and 18, it being understood that the sprockets, rollers, etc. can be as described above. In this instance, the means for turning shaft 18 to tension the record medium can take the form of a means for effectively shortening one side of the belt while lengthening the other. Thus a pair of rollers 46 and 47 can be carried by an arm 48 which is fixed to a shaft 49. Also carried by the shaft is an actuating lever 50 which can be pivoted as indicated in FIGS. 8 and 9 to move the rollers 46 and 47 about shaft 49 so as to cause shaft 18 to rotate with respect to shaft 17. A suitable resilient means, such as spring 51, can be used to bias the arrangement to the FIG. 8 position and against a stop 52. With this arrangement and with the chart paper placed loosely over sprockets 14 and 15 (which are of course carried by shafts 17 and 18 as described above), movement of lever 50 downwardly, as by pushing it down by closing the recorder cover 35, causes the upper side 43a of the belt to tend to become shorter while the lower side 43b tends to become longer. This effectively causes rotation of shaft 18 with respect to shaft 17 thereby tensioning the spring 21 connecting between shaft 18 and sprocket 15. Upon opening the cover, the action is reversed and spring 51 causes the lever 50 to move upwardly resulting in turning of shaft 18 counterclockwise which in turn results in loosening of the chart.

From the foregoing, it will be seen that this invention is one well adapted to attain all of the ends and objects hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A graphic recorder wherein information is plotted on a strip of chart paper having at least one set of spaced perforations along the length thereof comprising, in combination; a frame; first and second sprockets rotatably mounted on said frame and having projections disposed to engage the perforations in such strip; means providing a reversible positive non-slipping driving connection between said first and second sprockets to cause them to rotate in unison and for tensioning such strip when engaged by the sprockets to cause it to lie smooth in an area where a record is being made and also to accurately position such strip with respect to said first sprocket regardless of whether such strip is being moved in a forward or reverse direction; and chart marking means carried by said frame for movement transversely across such strip along a path which is at a predetermined relationship with respect to said first sprocket.

2. The graphic recorder of claim 1 wherein the first mentioned means includes a shaft rotatably mounted on said frame; said driving connection being between said first sprocket and said shaft to cause them to rotate in unison; and means rotatably mounting said second sprocket on said shaft including means providing a resilient force transmitting connection between said shaft and said second sprocket and, when such strip is in engagement with said first and second sprockets, resiliently biasing the second sprocket in a direction to tension such strip at all times during movement of such strip in either direction.

3. The graphic recorder of claim 2 in further combination with a strip roller mounted on and fixed to the shaft adjacent said second sprocket, the latter being rotatable relative to the roller to thereby minimize inertial effects and hence variations in tension on the strip.

4. In a graphic recorder wherein information is plotted on a strip of chart paper having at least one set of spaced perforations along the length thereof comprising, in combination; a frame; first and second sprockets rotatably mounted on said frame and having projections disposed to engage the perforations in such strip; means providing a reversible driving connection between said first and second sprockets including means resiliently biasing said second sprocket so as to cause it to tend to rotate in a direction to tension such strip when engaged by the sprockets regardless of the direction of strip movement, the first mentioned means providing, with such strip engaging said sprockets, a non-slipping connection between the sprockets to cause them to rotate in unison; and chart marking means carried by said frame for movement transversely across such strip along a path which is at a predetermined relationship with respect to said first sprocket.

5. In a graphic recorder wherein information is plotted on a strip of chart paper having at least one set of spaced perforations along the length thereof comprising, in combination; a frame; first and second sprockets rotatably mounted on said frame and having projections disposed to engage the perforations in such strip; means providing a driving connection between said first and second sprockets to cause them to rotate in unison and including means for rotating said sprockets relative to each other in a direction to tension any strip connected therebetween and further including means resiliently biasing said second sprocket so as to cause it to tend to rotate in said direction, whereby when a strip is placed so as to engage said sprockets, actuation of said means to rotate said sprockets relative to each other causes tensioning of such strip and provides a resilient force maintaining such strip in tension; and, at the same time, positioning a portion of the strip where a plot is to be made at a predetermined position relative to the first sprocket; and chart marking means carried by said frame for movement transversely across such strip along a path coinciding with said positioned portion of the strip.

6. The graphic recorder of claim 5 wherein said means providing a driving connection includes a shaft, means rotatably mounting said second sprocket on said shaft, said resilient biasing means being connected between the second sprocket and shaft so that upon placing such strip in engagement with said sprockets and turning said shaft in said direction, the second sprocket is rotated to tension such strip and further rotation of the shaft causes it to rotate relative to the second sprocket and actuate said resilient means so that the latter acts as the force transmitting connection between the second sprocket and shaft.

7. The graphic recorder of claim 6 wherein said means providing a driving connection includes a gear train having at least first, second and third inter-meshing gears and wherein said means for rotating said sprockets relative to each other includes means mounting said second gear for movement laterally of the first and third gears while maintaining tooth engagement with each so as to cause at least one of said first and third gears to rotate thereby rotating at least one of said sprockets.

8. The graphic recorder of claim 7 wherein said second gear mounting means includes a part extending from the frame for engagement with a door of the recorder so that closing of such door causes the gear mounting means to move to tension a strip of chart paper engaging the sprockets.

9. The graphic recorder of claim 6 wherein said means providing a driving connection includes a belt drivingly connected to said sprockets and wherein said means for rotating said sprockets relative to each other includes means for effectively lengthening one side of the belt while shortening the other and vice versa.

10. The graphic recorder of claim 5 wherein said means providing a driving connection includes a gear train having at least first, second and third intermeshing gears and wherein said means for rotating said sprockets relative to each other includes means mounting said second gear for movement laterally of the first and third gears while maintaining tooth engagement with each so as to cause at least one of said first and third gears to rotate thereby rotating at least one of said sprockets, and wherein said biasing means includes a part resiliently connected to said mounting means so that upon movement of said part a first distance, at least one of said sprockets will be rotated relative to the other to tension a strip of chart paper therebetween and upon movement of said part through an additional distance, a resilient force will be applied to maintain tension in such strip.

11. A drive mechanism for moving a strip of recording medium having at least one set of spaced perforations along the length thereof comprising, in combination; a frame; first and second shafts rotatably mounted on said frame; first and second sprockets mounted respectively on said shafts and having projections disposed to engage the perforations in such recording medium; first and second chart rollers mounted respectively on said shafts adjacent said sprockets; the chart rollers and first sprocket being fixed to their respective shafts while the second sprocket is rotatably mounted on its shaft; a resilient torque transmitting connection between said second sprocket and its shaft and, with such recording medium in engagement with said sprockets, resiliently biasing the second sprocket in a direction to tension such recording medium at all times during movement of the recording medium in either direction and also minimizing the inertial effect of said second roller on the tension in such recording medium; and means providing a positive non-slipping reversible driving connection between said first and second shafts to cause them to rotate in unison.

12. A graphic recorder wherein information is plotted on a strip of recording medium having at least one set of spaced perforations along the length thereof comprising, in combination; a frame; first and second shafts rotatably mounted on said frame; first and second sprockets mounted respectively on said shafts and having projections disposed to engage the perforations in such recording medium; said first sprocket being fixed to said first shaft while the second sprocket is rotatably mounted on said second shaft; a resilient torque transmitting connection between said second sprocket and said second shaft and, with such recording medium in engagement with said sprockets, resiliently biasing the second sprocket in a direction to tension such recording medium at all times during movement of the recording medium in either direction and also minimizing the inertial effect of said second shaft on the tension in such recording medium; means providing a positive non-slipping reversible driving connection between said first and second shafts to cause them to rotate in unison; and marking means carried by said frame for movement relative to such recording medium.

13. A graphic recorder wherein information is plotted on a strip of recording medium having at least one set of spaced perforations along the length thereof comprising, in combination; a frame; first and second shafts rotatably mounted on said frame; a first sprocket fixed to said first shaft, a pair of second sprockets rotatably mounted on said second shaft, said sprockets having projections disposed to engage the perforations in such recording medium; a resilient torque transmitting connection between said second sprockets and said second shaft and, with such recording medium in engagement with said sprockets, resiliently and independently biasing each second sprocket in a direction to tension such recording medium at all times during movement of the recording medium in either direction and also minimizing the inertial effect of said second shaft on the tension in such recording medium; means providing a positive non-slipping reversible driving connection between said first and second shafts to cause them to rotate in unison; and marking means carried by said frame for movement relative to such recording medium.

References Cited
UNITED STATES PATENTS 2,690,951  10/1954  Moore _____ 346—136
2,845,232   7/1958  Johnson.

M. HENSON WOOD, Jr., Primary Examiner
RICHARD A. SCHACHER, Assistant Examiner

U.S. Cl. X.R.
226—195